United States Patent Office 3,115,383
Patented Dec. 24, 1963

3,115,383
PROCESS FOR REACTING CELLULOSIC MATERIAL WITH POLYQUATERNARY AMMONIUM DERIVATIVES OF BIS HALOMETHYL ETHERS AND PRODUCTS RESULTING THEREFROM
Giuliana C. Tesoro, Dobbs Ferry, N.Y., assignor to J. P. Stevens & Co., Inc., New York, N.Y., a corporation of Delaware
No Drawing. Filed Apr. 12, 1960, Ser. No. 21,614
15 Claims. (Cl. 8—116.2)

This invention relates to a treatment of cellulosic materials with aqueous solutions of polyquaternary ammonium compounds, which have been prepared from polyhalomethyl ethers of polyhydric alcohols and tertiary amines, for the purpose of improving the crease resistance of the fabrics. More specifically this invention relates to a novel process for reacting cellulosic fabrics with bis pyridinium salts of bis chloromethyl ethers of dihydric alcohols whereby the crease recovery of the fabrics is improved. This invention also relates to the improved fabrics resulting from the foregoing treatment.

It has been suggested that certain polyfunctional reagents enhance the crease recovery of cellulosic fabrics by crosslinking adjacent cellulose chains.[1] Direct experimental proof of this hypothesis has not been obtained and some investigators still maintain that factors other than cross-linking are important, or even essential, for increasing the elastic recovery of cellulose fibers, and the crease recovery of cellulosic fabrics. However, progress in the theoretical knowledge of polymer chemistry and the accumulation of experimental evidence have favored the crosslinking hypothesis heavily, and the postulate that the crosslinking of cellulose chains is essential for imparting a satisfactory level of crease recovery to cellulosic fabrics is now widely accepted as fact. In the crosslinking of cellulosic fabrics the following factors are known to have a profound effect on the physico-mechanical properties of the crosslinked polymer:

(a) The properties of the linear cellulose polymer;
(b) The reaction conditions required;
(c) The extent of the crosslinking reaction;
(d) The structure and distribution of the crosslinks formed.

In addition, it is essential from a practical standpoint that the crosslinking reaction should fulfill the following requirements:

(A) It should involve the use of a polyfunctional crosslinking agent capable of forming stable chemical bonds with the hydroxyl groups of the cellulose molecule under conditions which do not adversely affect the fiber. The simplest case is that of a symmetrical bifunctional reagent.
(B) The crosslinking reagent should not be capable of polymerization or self-condensation under the prevailing reaction conditions. In other words, resin deposition and formation of polymeric crosslinks should be avoided.
(C) The functional groups of the crosslinking agent should react completely, so that formation of monomeric side chains is avoided. This condition is more easily met with a reagent where all functional groups have equal reactivity.
(D) The crosslink formed should not contain functional groups, such as hydroxyls, which can become reaction sites and lead to the formation of polymeric side chains in a graft polymerizaiton reaction.
(E) Decomposition of the crosslinking reagent should preferably not take place under the prevailing reaction conditions. If decomposition does occur, it should result in the formation of by-products which are not capable of reaction with cellulose and can be readily removed.
(F) Similarly, the crosslinking agent should not combine with the reaction medium (usually water) at an appreciable rate. If it does, it should form unreactive by-products which can be readily removed.
(G) Intramolecular crosslinking (substitution) should be insignificant under prevailing reaction conditions.

It is apparent that the crosslinking agents which are commonly used in crease proofing finishes do not fulfill the requirements listed. These agents, which include among others, the thermosetting resins, the polyepoxides, polyacetals, and polyfunctional ethylene imine derivatives, all exhibit (to varying degrees) a tendency to polymerize under the conditions required for reacting them with cellulose hydroxyl groups. Moreover, since the efficiency of the reaction of these agents with cellulose is generally of the order of 50 to 70%, one must conclude that side reactions play an important role.

It is, therefore, an object of this invention to provide a novel process of reacting cellulosic fabrics with quaternary ammonium derivatives of polychloromethyl ethers in which the crease recovery, wrinkle resistance, and dimensional stability of the cellulosic fabrics such as cotton and regenerated cellulose are improved. A further object of this invention is to effect an improved crosslinking of cellulosic materials or fabrics by the aforementioned quaternary ammonium derivatives. A still further object of the novel process of this invention is to effect a crosslinking of cellulosic fabrics by the aforementioned quaternary ammonium compounds in which undesirable side reactions and the formation of by-products such as formaldehyde are suppressed. More specifically an object of this invention is to provide a process for improving the crease recovery of cellulosic fabrics by reacting the same with the above mentioned quaternary ammonium compounds in which the formation of formaldehyde as a by-product with its concomitant disadvantages is avoided. These and other objects of this invention will be apparent from the description which follows.

The novel process of this invention comprises reacting cellulosic fabrics with polyquaternary ammonium derivatives of polyhalomethyl ethers as the crosslinking agents in the presence of a buffer under controlled conditions of concentration, temperature, and time to obtain an improved crease resistant fabric without the formation of formaldehyde and its subsequent reaction with the fabric. More specifically the foregoing may be stated as involving the reaction of bis pyridinium salts of bis chloromethyl ethers (A) with cellulose (B) in the presence of ---
[1] Cameron, W. G., and Morton, T. H.: J. Soc. Dyers and Colourists 64, 329–336 (1948).

a buffer (C), such as sodium acetate, and may be illustrated as follows:

(1)
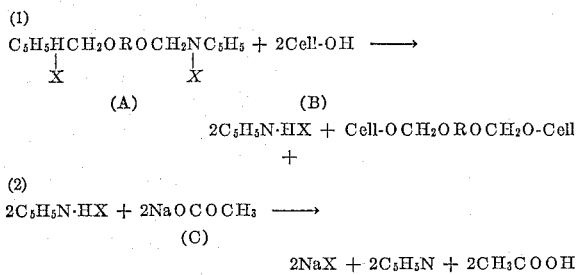

$$2C_5H_5N \cdot HX + \text{Cell-O}CH_2OROCH_2O\text{-Cell}$$
$$+$$

(2)
$$2C_5H_5N \cdot HX + 2NaOCOCH_3 \longrightarrow$$
(C)
$$2NaX + 2C_5H_5N + 2CH_3COOH$$

(3)
$$\underset{X}{C_5H_5NCH_2OROCH_2NC_5H_5} + 2\text{Cell-OH} + 2NaOCOCH_3 \longrightarrow$$
$$\text{Cell-O}CH_2OROCH_2O\text{-Cell} + 2NaX + 2C_5H_5N + 2CH_2COOH$$

R in the above equations is equal to $(CH_2CH_2O)_mC_nH_{2n}$ where $m$ has a value from 0 to 4 and $n$ has a value from 2 to 10 provided that where $m$ is 1 or more, $n$ has a value of 2 only; and X is a halogen selected from the group consisting of chlorine, bromine, and iodine.

In general the process consists of padding a cellulosic fabric, such as cotton, with an aqueous solution containing the bis quaternary compound and the buffer salt, drying at low temperatures (100–140° F.), and heat curing the padded fabric under carefully controlled conditions.

While the reaction of bis pyridinium salts of bis chloromethyl ethers with cellulose has been reported in the literature, I am not aware of any publication which deals with a quantitative treatment of the reaction or which presents data on the physical properties of the treated cellulose as set forth in the description and examples which follow. In contrast to the results obtained by the specific reaction conditions recited herein, it appears that the reaction conditions used by previous investigators did not avoid (1) the decomposition of the crosslinking agents, (2) the formation of objectionable by-products such as the polyformals and formaldehyde, and (3) undesirable side reactions.

The present invention will be more completely understood by reference to the following examples. In each instance all parts and percentages are by weight unless otherwise specified. It is to be understood that the examples given are merely illustrative and are not intended to limit the invention in any way.

The preparation of bis chloromethyl ethers is carried out by known methods from 1 mol of the glycol and two mols of paraformaldehyde by passing hydrogen chloride gas through the reaction mixture preferably at 20–30° C. The reaction may be carried out without solvent or in the presence of an inert solvent (for example, benzene, dioxane, diethyl ether, and the like). If desired, inert drying agent (for example, calcium chloride) may be incorporated in the reaction mixture in order to hold the water formed during the reaction. The products are then purified by vacuum distillation.

Representative bis chloromethyl ethers which have been prepared are set forth in Table I below:

TABLE I

Bis Halomethyl Ethers of Glycols $(XCH_2OROCH_2X)$

| Example No. | R= a | X a | Product B.P. | Percent Cl Calcd. | Percent Cl Found |
|---|---|---|---|---|---|
| 1 | $-(CH_2)_2-$ | Cl | 105–107°/32 mm | 44.6 | 44.0 |
| 2 | $-CH_2CH_2OCH_2CH_2-$ | Cl | 125–127°/15 mm | 34.6 | 33.9 |
| 3 | $-(CH_2CH_2O)_2CH_2CH_2-$ | Cl | 149–152°/6 mm | 28.8 | 26.5 |
| 4 | $-\underset{\underset{CH_3}{\mid}}{CH}-CH_2-$ | Cl | 110–114°/30 mm | 41.0 | 39.2 |
| 5 | $-CH_2CH_2\underset{\underset{CH_3}{\mid}}{CH}-CH_2CH_2-$ | Cl | 155–158°/27 mm | 33.0 | 32.0 |
| 6 | $-(CH_2)_4-$ | Cl | 120–121°/14 mm | 38.0 | 35.2 |
| 7 | $-(CH_2)_5-$ | Cl | 125–127°/11 mm | 35.0 | 35.5 |
| 8 | $-(CH_2)_{10}-$ | Cl | 165–170°/5 mm | 26.1 | 25.4 |
| 9 | $-CH_2CH=CHCH_2-$ | Cl | 104–109°/9 mm | 33.0 | 36.9 |
| 10 | $-CH_2\underset{\underset{Br}{\mid}}{CH}\underset{\underset{Br}{\mid}}{CH}CH_2-$ | Cl | 168–175°/11 mm | 20.6 | 20.4 |
| 11 | $-CH_2\underset{\underset{Cl}{\mid}}{CH}\underset{\underset{Cl}{\mid}}{CH}CH_2-$ | Cl | 159–163°/29 mm | | |
| 12 | (bicyclic structure with O–CH_2, CH_2, C, CH_2) | Cl | 160–175°/112 mm | 28.9 | 25.5 |
| 13 | $-CH_2CH$ (cyclic CH_2-CH_2/CH_2-CH_2) $CH-CH_2-$ | Cl | dec. on distillation | | |
| 14 | $-CH_2-$ (tetrachlorophenylene) $-CH_2-$ | Cl | | 18.3 | 18.2 | a R and X have the same meaning as in Equations 1, 2, and 3 above.

The preparation of bis pyridinium salts of bis chloromethyl ethers of polyhydric alcohols is carried out by dissolving 2.2 mols of pyridine in an appropriate moisture-free inert solvent (for example, benzene, petroleum ether, dioxane, etc.) and adding 1 mol of the bis chloromethyl ether with cooling. The crystalline precipitate which is formed is filtered and dried. Care must be taken to handle and store the quaternary ammonium compounds in the absence of moisture.

Representative bis pyridinium salts of bis chloromethyl ethers of glycols which have been prepared are set forth in Table II below:

TABLE II

*Bis Pyridinium Salts of Bis Halomethyl Ethers of Glycols*

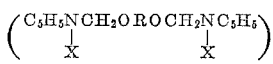

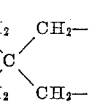

| Example No. | R= [a] | X [a] | Percent Cl Calcd. | Percent Cl Found | Equiv. Wt. |
|---|---|---|---|---|---|
| 15 [b] | —CH₂)₂— | Cl | 22.4 | 22.0 | 159 |
| 16 [c] | —CH₂CH₂OCH₂CH₂— | Cl | 19.6 | 19.3 | 181 |
| 17 [d] | —CH—CH₂—<br>    \|<br>   CH₃ | Cl | 21.4 | 21.2 | 166 |
| 18 [e] | —(CH₂)₄— | Cl | 20.6 | 18.0 | 173 |
| 19 [f] | —(CH₂)₅— | Cl | 19.8 | 19.2 | 180 |
| 20 [g] | —(CH₂)₁₀— | Cl | 16.5 | 16.0 | 215 |
| 21 | (polycyclic structure) | Cl | 17.6 | 17.2 | 202 |

[a] R and X have the same meaning as in Equations 1, 2 and 3 above.
[b] 1,2-Bis (pyridinium-methoxy) ethane dichloride.
[c] Bis (pyridinium-methoxyethyl) ether dichloride.
[d] 1-methyl-1,2-bis (pyridinium-methoxy) ethane dichloride.
[e] 1,4-Bis (pyridinium-methoxy) butane dichloride.
[f] 1,5-Bis (pyridinium-methoxy) pentane dichloride.
[g] 1,10-Bis (pyridinium-methoxy) decane dichloride.

The reaction of the quaternary ammonium compounds with fabrics manufactured from cellulosic fibers is carried out, for example, by impregnating a bleached desized cotton print cloth (80 x 80 count) with a solution containing the quaternary ammonium compounds of Table II above and a buffer salt, drying preferably at low temperature (100–140° F.), and baking or curing. After curing, the fabric is washed in order to remove residual salts. The fabrics thus treated exhibit vastly improved crease recovery, dimensional stability and wrinkle resistance. This can be shown by suitable test methods, for example by the test described in the technical manual of the American Association of Textile Chemists and Colorists (1959 edition) on p. 171, method No. 66–1959, ASTM designation D–1295–53T.

When the untreated fabric is tested by this method the crease recovery angle (warp plus filing) is 140°. The fabrics treated by our process exhibit crease recovery angles of about 220° to 270°, an improvement of about 50% to 95% over the untreated fabrics.

Examples 22 to 34, inclusive, from Table III below are representative of the improved crease recovery obtained when the cellulosic fabric was treated according to the conditions disclosed in the present invention. By way of comparison, Examples 35 to 38, inclusive, illustrate the undesirable results obtained when the cellulosic fabrics are not treated in strict accordance with the teachings of the present invention. Specifically, Examples 35 to 38 illustrate the effect of (a) Insufficient buffer—giving large strength loss
(b) Excessive cure—giving large strength loss
(c) Too much buffer—slow reaction giving low crease recovery
(d) Insufficient cure—low yield giving low crease recovery The above examples (15–21) set forth in Table II are merely illustrative, and it is to be understood that tertiary amines other than pyridine can be used for the preparation of the quaternary ammonium compounds. In general any tertiary amine which is a weak base, that is, having an ionization constant of 10⁻⁸ and lower, such as, dimethyl aniline, diethyl aniline, lutidine, picoline, quinoline and isoquinoline will prove satisfactory.

TABLE III

*Treatment of Cellulosic Fabrics With Examples of Table II*

| Example No. | Compound Applied (Example No.) | Compound Concen. (eq./liter) | Sodium Acetate (eq./liter) | Sodium Acetate (Percent of calcd.) | Curing time (min.) Temp., °F. | Crease Recovery Angle, Degrees (W+F) [a] | Percent Tensile Strength Retained (warp) [b] |
|---|---|---|---|---|---|---|---|
| 22 | 15 | 1.75 | 1.4 | 80 | 4'300° | 278 | 52 |
| 23 | 15 | 1.25 | 0.75 | 60 | 2'300° | 263 | 60 |
| 24 | 15 | 0.94 | 0.5 | 55 | 2'300° | 244 | 67 |
| 25 | 15 | 0.62 | 0.5 | 80 | 3'300° | 228 | 75 |
| 26 | 16 | 1.25 | 0.75 | 60 | 2'300° | 266 | 64 |
| 27 | 16 | 0.94 | 0.75 | 80 | 3'320° | 249 | 70 |
| 28 | 16 | 0.62 | 0.43 | 70 | 5'280° | 222 | 77 |
| 29 | 19 | 1.25 | 0.75 | 60 | 3'300° | 258 | 61 |
| 30 | 19 | 0.94 | 0.83 | 90 | 7'300° | 246 | 71 |
| 31 | 19 | 0.62 | 0.5 | 80 | 3'310° | 227 | 76 |
| 32 | 20 | 1.25 | 1.25 | 100 | 10'300° | 263 | 57 |
| 33 | 20 | 0.94 | 0.94 | 100 | 3'300° | 241 | 67 |
| 34 | 20 | 0.62 | 0.31 | 50 | 1'325° | 219 | 81 |
| Untreated control | | | | | | 140 | 100 |
| 35 | 15 | 1.25 | 0.25 | 20 | 3'300° | 258 | 25 |
| 36 | 15 | 1.25 | 0.75 | 60 | 30'300° | 251 | 23 |
| 37 | 15 | 1.25 | 1.75 | 140 | 10'300° | 192 | 78 |
| 38 | 15 | 1.25 | 0.75 | 60 | 1'250° | 182 | 71 |

[a] Monsanto method. Described in the Technical Manual of the American Association of Textile Chemists and Colorists, (1959 edition) on p. 171, Method No. 66–1959, ASTM designation D–1295–53T.
[b] Ravel strip method. See Method No. 5104 of Federal Specification CCC–T–191B.

It will be apparent to those skilled in the art that various modifications can be made without departing from the inventive principles herein disclosed. For example, the buffer salts can be any of the alkali metal salts such as the acetates, carbonates, bicarbonates, phosphates, and borates of sodium and potassium. The acetates are preferred due to their excellent solubility properties, combined with the volatile nature of the acid formed when the buffer salt reacts with pyridine hydrochloride.

The amount of buffer salt needed will depend upon the curing conditions. If relatively mild curing conditions are employed (2 to 10 minutes at 275° to 300° F.), the amount of buffer salt used should be between 50% and 100% of the amount equivalent to the pyridinium chloride groups present in the solution. About 60 to 80% of the stochiometric amount is the preferred range.

If the amount of buffer salt is between 50% and 100% of the amount equivalent to the reagent, the curing conditions required will be 1 to 10 minutes at 275° to 350° F. (shorter times are required at higher temperature). With 60% to 80% of the calculated amount of buffer, the preferred curing conditions are 2 to 5 minutes at 300° F.

The treating solution of the quaternary ammonium compound should contain between 0.4 and 2.0 equivalents/liter of the reagent. A range of 0.6 to 1.25 eq./liter is preferred. For a solution containing 1.0 eq./liter of reagent, the amount of buffer salt will range from 0.5 to 1.0 eq./liter, with 0.6 to 0.8 as the preferred concentration.

The quaternary ammonium compound used should not contain substantial amounts of glycol, formaldehyde and pyridine hydrochloride if optimum results are to be obtained when the compound is reacted with cellulose. The compound used should contain at least 75% and preferably over 90% quaternary ammonium compound as determined by analysis.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable equivalents thereof by those skilled in the art to which the invention pertains.

What is claimed is:

1. A process of treating a cellulosic fabric selected from the group consisting of cellulose and regenerated cellulose fabrics for the purpose of improving the crease resistance thereof comprising impregnating the fabric with an aqueous solution of a mixture of (a) a bis quaternary ammonium salt of a bis halomethyl ether of the structure:

$$Z:NCH_2O\ Q\ OCH_2N:Z$$
$$\quad\ \ X \qquad\qquad X$$

where N:Z is a tertiary amine having an ionization constant of $10^{-8}$ and lower, Q is an organic radical consisting of carbon, oxygen, hydrogen, and halogen atoms, and X is a halogen selected from the group consisting of chlorine, bromine, and iodine; and (b) a buffer salt selected from the group consisting of the acetates, carbonates, bicarbonates, phosphates and borates of the alkali metals; drying said fabric; and thereafter heat curing the fabric.

2. A process of treating a cellulosic fabric selected from the group consisting of cellulose and regenerated cellulose fabrics for the purpose of improving the crease resistance thereof comprising impregnating the fabric with an aqueous solution of a mixture of (a) a buffer salt selected from the group consisting of the acetates, carbonates, bicarbonates, phosphates and borates of the alkali metals; and (b) a bis quaternary ammonium salt of a bis halomethyl ether of the structure:

$$Z:NCH_2O\ Q\ OCH_2N:Z$$
$$\quad\ \ X \qquad\qquad X$$

where N:Z is a tertiary amine having an ionization constant of $10^{-8}$ and lower, X is a halogen selected from the group consisting of chlorine, bromine, and iodine; and Q is a member selected from the group consisting of (1) $-(CH_2CH_2O)_m C_n H_{2n}-$ wherein $m$ has a value of 0 to 4 and $n$ has a value of 2 to 10 provided that where $m$ has a value of 1 or more, $n$ is only 2;

(2) $\quad -CH_2CH=CHCH_2-$ (3) $\quad -CH_2CHCHCH_2-$
$\qquad\qquad\quad\ \ X'\ \ X'$ where $X'$ is a member selected from the group consisting of bromine, iodine, and chlorine;

(4) 
$$\begin{array}{c} O-CH_2 \quad CH_2- \\ CH_2 \diagdown C \diagup \\ O-CH_2 \quad CH_2- \end{array}$$

(5)
$$-CH_2-CH \begin{array}{c} CH_2-CH_2 \\ \diagdown \diagup \\ \diagup \diagdown \\ CH_2-CH_2 \end{array} CH-CH_2-$$

and (6)
$$-CH_2-\underset{\underset{Cl}{|}\ \ \underset{Cl}{|}}{\overset{\overset{Cl}{|}\ \ \overset{Cl}{|}}{\bigcirc}}-CH_2-$$

drying said fabric; and thereafter heat curing the fabric.

3. A process of treating a cellulosic fabric selected from the group consisting of cellulose and regenerated cellulose fabrics for the purpose of improving the crease resistance thereof comprising impregnating the fabric with an aqueous solution of a mixture of (a) a bis quaternary ammonium salt of a bis chloromethyl ether of the structure:

$$C_5H_5N-CH_2O(CH_2CH_2O)_m(C_nH_{2n})OCH_2-NC_5H_5$$
$$\quad\ \ |\qquad\qquad\qquad\qquad\qquad\qquad\qquad |$$
$$\quad\ \ X\qquad\qquad\qquad\qquad\qquad\qquad\qquad X$$

wherein $m$ has a value of 0 to 4 and $n$ has a value of 2 to 10 provided that where $m$ has a value of 1 or more, $n$ is only 2; and X is a halogen selected from the group consisting of chlorine, bromine, and iodine; and (b) a buffer salt selected from the group consisting of the acetates, carbonates, bicarbonates, phosphates and borates of the alkali metals; drying said fabric; and thereafter heat curing the fabric.

4. The process of claim 3 in which 0.4 to 2.0 equivalents of the quaternary salt per liter of water are employed, the amount of buffer salt used is between 0.5 and 1.0 equivalent of the quaternary salt present in solution and the curing conditions are from about 1 to 10 minutes at about 275–350° F.

5. The process of claim 3 in which between 0.6 to 1.75 equivalents of the quaternary salt per liter of water are employed, the amount of buffer salt used is between 0.5 and 1.0 equivalents of the quaternary salt present in solution and the curing conditions are from about 1 to 10 minutes at about 280–325° F.

6. The process of claim 4 in which the amount of buffer salt used is between 0.6 to 0.8 equivalent of the quaternary salt present in solution and the curing conditions are from about 2 to 5 minutes at about 300° F.

7. The process of claim 2 in which the bis quaternary ammonium salt is $$C_5H_5NCH_2O(CH_2)_2OCH_2NC_5H_5$$
$$\qquad |\qquad\qquad\qquad\qquad\quad |$$
$$\qquad Cl\qquad\qquad\qquad\qquad\quad Cl$$

and the buffer is sodium acetate.

8. The process of claim 2 in which the bis quaternary ammonium salt is $$C_5H_5NCH_2O(CH_2)_2O(CH_2)_2OCH_2NC_5H_5$$
$$\qquad |\qquad\qquad\qquad\qquad\qquad\qquad |$$
$$\qquad Cl\qquad\qquad\qquad\qquad\qquad\qquad Cl$$

and the buffer is sodium acetate.

9. The process of claim 2 in which the bis quaternary ammonium salt is $$C_5H_5NCH_2O(CH_2)_5OCH_2NC_5H_5$$
$$\qquad |\qquad\qquad\qquad\qquad\quad |$$
$$\qquad Cl\qquad\qquad\qquad\qquad\quad Cl$$

and the buffer is sodium acetate.

10. The process of claim 2 in which the bis quaternary ammonium salt is $$C_5H_5NCH_2O(CH_2)_{10}OCH_2NC_5H_5$$
$$\qquad |\qquad\qquad\qquad\qquad\qquad |$$
$$\qquad Cl\qquad\qquad\qquad\qquad\qquad Cl$$

and the buffer is sodium acetate.

11. The process of claim 2 in which the bis quaternary ammonium salt is $$C_5H_5NCH_2OCHCH_2OCH_2NC_5H_5$$
$$\phantom{C_5H_5N}|\phantom{CH_2O}|\phantom{CHCH_2OCH_2N}|$$
$$\phantom{C_5H_5NC}Cl\phantom{H_2O}CH_3\phantom{CH_2OCH_2NC_5}Cl$$

and the buffer is sodium acetate.

12. Cellulosic material selected from the group consisting of cellulose and regenerated cellulose fabrics resulting from the treatments according to the process of claim 1, and being characterized by having an improved crease recovery, wrinkle resistance, and dimensional stability.

13. Cellulosic material selected from the group consisting of cellulose and regenerated cellulose fabrics resulting from the treatments according to the process of claim 2, and being characterized by having an improved crease recovery, wrinkle resistance, and dimensional stability.

14. The process of claim 2 wherein the cellulosic fabric is cotton.

15. The process of claim 2 wherein the cellulosic fabric is regenerated cellulose.

References Cited in the file of this patent

UNITED STATES PATENTS

| | | |
|---|---|---|
| 2,351,581 | Bock et al. | Jan. 20, 1944 |
| 2,433,267 | Feinstone et al. | Dec. 23, 1947 |
| 2,483,749 | Wittcoff | Oct. 4, 1949 |
| 2,497,731 | Hoffman | Feb. 14, 1950 |
| 2,537,064 | Kropa et al. | Jan. 9, 1951 |
| 2,637,623 | Janes | May 5, 1953 |
| 2,940,817 | Browne | June 14, 1960 |
| 2,971,815 | Bullock | Feb. 14, 1961 |
| 3,061,399 | Tesoro et al. | Oct. 30, 1962 |